(12) United States Patent
Virdhagriswaran

(10) Patent No.: US 8,738,459 B2
(45) Date of Patent: May 27, 2014

(54) PRODUCT RECOMMENDATION

(75) Inventor: Sankar Virdhagriswaran, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 13/483,288

(22) Filed: May 30, 2012

(65) Prior Publication Data

US 2013/0325651 A1    Dec. 5, 2013

(51) Int. Cl.
*G06Q 30/00* (2012.01)

(52) U.S. Cl.
USPC ........................................................ 705/26.1

(58) Field of Classification Search
USPC ........................................................ 705/26.1
See application file for complete search history.

(56) References Cited

U.S. PATENT DOCUMENTS

| | | | |
|---|---|---|---|
| 6,968,332 | B1 | 11/2005 | Milic-Frayling et al. |
| 2011/0153663 | A1 | 6/2011 | Koren et al. |
| 2013/0132392 | A1* | 5/2013 | Kenedy et al. ............ 707/737 |

OTHER PUBLICATIONS

Locate and Track In-Store Shopper via Camera and GPS, IP.com No. IPCOM000206261D, Electronic Publication Date: Apr. 15, 2011, http://priorartdatabase.com/IPCOM/000206261, 3 pages.
IBM, Method to Utilize Multiple User Data in Recommendation Systems for Coordination of Design and Purchase Decisions, IP.com No. IPCOM000190337D, Electronic Publication Date: Nov. 24, 2009, http://www.ip.com/pubview/IPCOM000190337D, 3 pages.
Yang et al., Effects of image interactivity technology adoption on e-shoppers' behavioural intentions with risk as moderator, Production Planning & Control, vol. 20, No. 4, Jun. 2009, pp. 370-382.
Li et al., An Empirical Research of Impacts of Review System on Online Shoppers' Intention Based on TAM, 978-1-4244-6977-2/10, 2010 IEEE, 4 pages.

* cited by examiner

*Primary Examiner* — Mila Airapetian
(74) *Attorney, Agent, or Firm* — Schmeiser, Olsen & Watts; John Pivnichny

(57) ABSTRACT

A method and system for generating recommendations is provided. The method includes accepting queries and revised assumptions associated with shopping habits of a shopper. Responses to the queries are generated. The responses are associated with product features for products. A group of shoppers and associated interests are characterized resulting in a creation of a group of recommended products. Alternative products associated with the recommended products are determined based on the revised assumptions and a consistency of assumptions is managed.

16 Claims, 4 Drawing Sheets

PRODUCT RECOMMENDATION

FIELD

The present invention relates to a method and associated system for recommending products for an individual.

BACKGROUND

Selecting items with respect to a user typically comprises an inaccurate process with little flexibility. Managing a selection process may include a complicated process that may be time consuming and require a large amount of resources. Accordingly, there exists a need in the art to overcome at least some of the deficiencies and limitations described herein.

SUMMARY

The present invention provides a method comprising: accepting, by a computer processor of a computing system executing an input and response generation layer of a software application, queries and assumptions associated with shopping habits of a shopper; generating, by the computer processor executing a content query engine of the software application, responses to the queries, the responses associated with product features for; characterizing, by the computer processor executing a heuristic reasoning engine of the software application; a group of shoppers and associated interests resulting in a creation of a group of recommended products, the group of shoppers associated with the shopper; determining, by the computer processor executing a dependency directed backtracking process with respect to the characterizing, alternative products associated with the recommended products; and managing, by the computer processor executing a truth maintenance engine of the software application, a consistency of assumptions generated during the executing the dependency directed backtracking process.

The present invention provides a computer program product, comprising a computer readable storage device storing a computer readable program code, the computer readable program code comprising an algorithm that when executed by a computer processor of a computing system implements a method, the method comprising: accepting, by the computer processor executing an input and response generation layer of a software application, queries and assumptions associated with shopping habits of a shopper; generating, by the computer processor executing a content query engine of the software application, responses to the queries, the responses associated with product features for products; characterizing, by the computer processor executing a heuristic reasoning engine of the software application; a group of shoppers and associated interests resulting in a creation of a group of recommended products, the group of shoppers associated with the shopper; determining, by the computer processor executing a dependency directed backtracking process with respect to the characterizing, alternative products associated with the recommended products; and managing, by the computer processor executing a truth maintenance engine of the software application, a consistency of assumptions generated during the executing the dependency directed backtracking process.

The present invention provides a computer system comprising a computer processor coupled to a computer-readable memory unit, the memory unit comprising instructions that when executed by the computer processor of a computing system implements a method comprising: accepting, by the computer processor executing an input and response generation layer of a software application, queries and assumptions associated with shopping habits of a shopper; generating, by the computer processor executing a content query engine of the software application, responses to the queries, the responses associated with product features for products; characterizing, by the computer processor executing a heuristic reasoning engine of the software application; a group of shoppers and associated interests resulting in a creation of a group of recommended products, the group of shoppers associated with the shopper; determining, by the computer processor executing a dependency directed backtracking process with respect to the characterizing, alternative products associated with the recommended products; and managing, by the computer processor executing a truth maintenance engine of the software application, a consistency of assumptions generated during the executing the dependency directed backtracking process.

The present invention provides a process for supporting computing infrastructure, the process comprising providing at least one support service for at least one of creating, integrating, hosting, maintaining, and deploying computer-readable code in a computer comprising a computer processor, wherein the computer processor carries out instructions contained in the code that when executed by the computer processor causes the computer to perform a method comprising the steps of: accepting, by the computer processor executing an input and response generation layer of a software application, queries and assumptions associated with shopping habits of a shopper; generating, by the computer processor executing a content query engine of the software application, responses to the queries, the responses associated with product features for products; characterizing, by the computer processor executing a heuristic reasoning engine of the software application; a group of shoppers and associated interests resulting in a creation of a group of recommended products, the group of shoppers associated with the shopper; determining, by the computer processor executing a dependency directed backtracking process with respect to the characterizing, alternative products associated with the recommended products; and managing, by the computer processor executing a truth maintenance engine of the software application, a consistency of assumptions generated during the executing the dependency directed backtracking process.

The present invention advantageously provides a simple method and associated system capable of selecting items.

DETAILED DESCRIPTION

Figure 1:
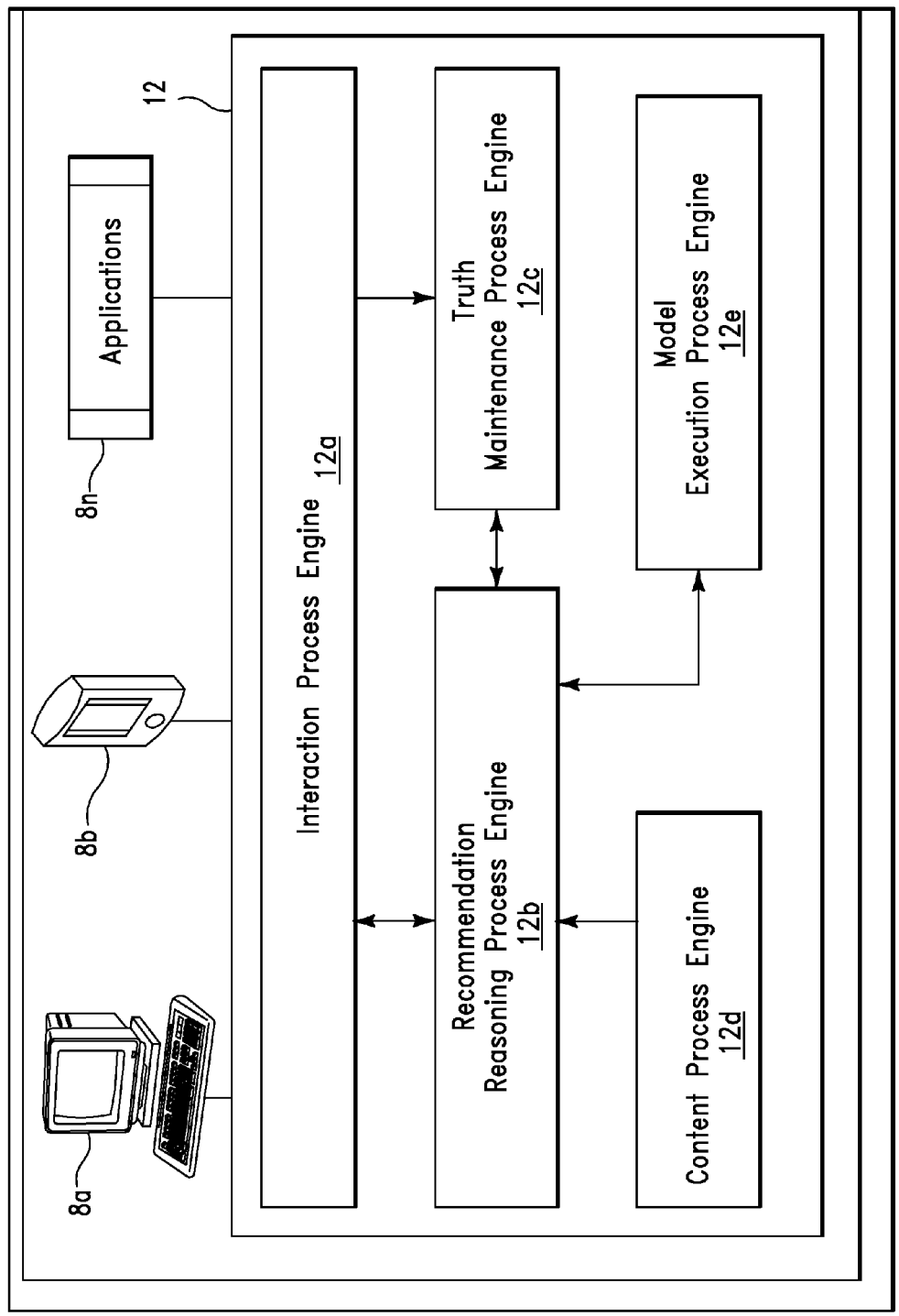
FIG. 1 illustrates a system 2 for recommending products for a shopper, in accordance with embodiments of the present invention.

FIG. 1 illustrates a system 2 for recommending products for a shopper, in accordance with embodiments of the present invention. System 2 enables a process for using dependency based reasoning to support exploration with respect to (online) shopping. The process is performed through the use of truth-maintenance and dependency directed backtracking. For example, when system 2 returns responses to a shopper(s), assumptions are generated. The assumptions are generated based on the shopper's buying model, product relevant keywords in queries submitted, and a class of shoppers inferred by matching the shopper(s) with a customer segmentation model. The assumptions and additional facts are asserted by a reasoning sub-system into a truth maintenance and dependency directed backtracking process (and may be optionally displayed to the shopper(s)). When the shopper modifies the assumptions (e.g., removes the assumptions or changes a value in some of the assumptions), system 2 re-initiates reasoning based on dependency information gathered to provide new responses, thereby allowing the shopper(s) to explore multiple options.

System 2 comprises a reasoning engine 12 (executed by a computer) that analyzes:

1. Mined shopper choice models.
2. Purchase behavior based grouping and categorization models of products of different types to support guided navigation.
3. Truth maintenance combined with conditional probabilities to support exploration in the context of the guided navigation.

Reasoning engine 12 is communicatively connected to computing devices/software applications 8a . . . 8n (e.g., on-line clients, POS terminals, applications, etc). Reasoning engine 12 comprises an interaction management process engine 12a, a recommendation reasoning process engine 12b, truth maintenance process engine 12c, a content process engine 12d, and a model execution process engine 12e. Reasoning engine 12 interacts (i.e., via interaction management process engine 12a) with its own working memory for reasoning and queries (i.e., via recommendation reasoning process engine 12b), external data/content sources (i.e., via content process engine 12d) for content and data, and interacts with model execution process engine 12e. Model execution process engine 12e executes statistical and other models to provide scores, probabilities, and other probabilistic data used in a reasoning process. Truth maintenance process engine 12c is invoked by the reasoning process to assert assumptions used when responding to queries and updating reasoning engine 12 after the assumptions have been modified based on user requests.

Reasoning engine 12 provides recommendations, explanations, and guides a shopper based on inferred characteristics (associated with the shopper and the shopper's similarity to other shoppers) and inferred interest in products of different types. Content (query) process engine 12d produces responses to queries on product features. Recommendation reasoning process engine 12b uses probabilistic models that characterize shoppers and associated interests for creating collections of items as recommendations. Additionally, recommendation reasoning process engine 12b uses dependency directed backtracking for allowing exploration of alternatives. Truth maintenance process engine 12c manages a consistency of assumptions asserted during guided navigation to support backtracking and retrieves needed facts to explore various options. Reasoning engine 12:

1. Allows shopper input to receive a query for products (through a web service based interface) and a selected set of assumptions for change.
2. Generates pairs of grouped listings and associated assumptions used to generate each of the grouped listings.
3. Uses tree based probabilistic models represented as rules, facts, and assumptions (facts with probabilities) to classify shoppers, associated shopping behaviors, and inferred interests along with tree based models that group products of various types.
4. Produces groups of alternate results for a rewritten query and uses truth maintenance process engine to assert assumptions used in producing responses and dependencies between the assumptions and associated reasoning.
5. Maintains a record of dependencies of individual rules that have been activated with additional rules, facts, and assumptions used to activate the rules (i.e., justifications).
6. Produces on request justifications for a particular rule to be activated as an explanatory tree.
7. Allows modification of assumptions (e.g., adding, removing, changing of values, etc).

The components (of reasoning engine 12) interaction management process engine 12a, recommendation reasoning process engine 12b, truth maintenance process engine 12c, content process engine 12d, and model execution process engine 12e are described as follows:

Interaction Management Process Engine 12a

Interaction management process engine 12a receives shopper queries and shopper inputs associated with questions and assumptions to be changed or removed. Responses to shopper inputs are returned asynchronously. Additionally, applications may register interest in receiving notifications asynchronously. Interaction management process engine 12a manages a queuing of requests and routing of responses to appropriate listeners. Requests to interaction management process engine 12a comprise the following types:

1. Requests comprising search strings or product identification information.
2. Requests comprising queries and assumptions requiring change.
3. Requests comprising assumptions requiring change across all queries that follow a request Responses from interaction management process engine 12a comprise the following types:
1. Groups of items/products and content associated with items (images, text, price, reviews, etc).
2. Questions associated with a returned list of groups of items.
3. Assumptions requiring change and are associated with a returned list of groups of items.

Recommendation Reasoning Process Engine 12b

Recommendation reasoning process engine 12b retrieves queries received from interaction management process engine 12a and responds with groups of items and assumptions used in creating the groups of items that may be changed by a user. Recommendation reasoning process engine 12b comprises the following sub-systems:

1. Object representation process.
2. Reasoning and grouping process.

The object representation process is used to store facts associated with shoppers and items that they are interested in. The object representation process comprises the use of a knowledge representation that supports a dynamic calculation of networks to which a shopper or item belongs (e.g., including configuration dependencies, shopper selection dependencies, social network dependencies, etc). The object representation process provides a fact store for the reasoning and grouping process by responding to queries on objects (e.g., products, shoppers, etc) and their features. Product models managed by the object representation process comprise the following sub-parts connected in a graph format:

1. Models of the products.
2. Alternative products.

3. Options to be offered with the products.
4. Product configuration relationships.
5. Product merchandizing relationships.

Models of products (product models) comprise information associated with multiple products organized into a category hierarchy. Each feature of a product is captured using feature-value pairs. Relationships between a product and its categories (a product may belong to multiple categories) are represented using the product model. Product models comprise computed features used to represent options and alternates. Computed features use models to provide a value of features instead of directly storing them as feature-value pairs. When a product is fetched in response to a query (at the time of a search), a product alternate model is invoked. The product alternate model returns a list of alternate products. These multi-valued responses are returned along with product information.

Product alternate models (alternative products) are generated through an off-line statistical analysis process that analyzes a beginning query for a product submitted by a user and the query that led to the shopper buying a product. The results of the beginning query are considered to be primary products and the products that the shopper purchased are considered to be alternates. Product alternate models create association rules from the primary products and alternate products in the off-line statistical analysis.

Product options are generated through an inverse off-line statistical analysis process that analyzes a beginning query for a product submitted by a user and the query that led to the shopper buying a product in the same way as product alternate models. A product option is created by analyzing baskets of goods purchased by a shopper. The most frequently purchased items in the basket that belong to a same category are considered to be options of each other.

Product configuration relationships comprise rules (specified by a manufacturer of the products) that specify products that belong together and constraints associated with products that are required to be bought together for an overall configuration comprising multiple products that are required to work together. Product and product alternative models and associated options are filtered through the product configuration models such that items that belong to valid configurations are grouped together and items that do not belong to valid configurations are sorted into a separate list.

Product merchandizing relationships are specified by product marketers to promote or constrain certain combination of products. A grouped and sorted list filtered through the product merchandizing relationships to assign a score to groups of configured items and individual items. The scores represent merchandising priorities.

Shopper section models are generated using shopping history data. Logit and probit models comprise two classes of models used to characterize selection probabilities of items in response to shopper queries. The selection probabilities are appended to each of the configured groups and item lists.

A reasoning process (enabled by recommendation reasoning process engine 12b) comprises reasoner components that may calculate and assert relationships between products based on customer choice models. These reasoner components include:

1. A product dependency reasoner component that retrieves a shopper query as an input and returns products that match the query, alternate products, optional products that go with the product list that matched the query, and marketed products that are promoted with the selected products and their alternates.
2. A grouping reasoner component that retrieves a selected product list (from the product dependency reasoner component) as input and uses configuration rules and merchandising rules to group selected products and their alternates into collections.
3. A Shopper selection reasoner component retrieves grouped lists as input and assigns a selection probability for each collection based on shopper choice models.
4. A product dependency reasoner component uses mined rule based models managed by a model management process to infer valid configurations that customers are buying together. The inferred models may include:
1. Category level rules for optional products that are sold with another primary product (e.g., when a flat panel monitor is purchased, an HDMI cable is additionally purchased within an electronics category).
2. Similar/alternate product rules or decision trees that comprise products of a same type but differing in characteristics (e.g., an HDMI cable with different ends).
3. Merchandising rules of products that are sold together from a retailer's perspective.

Given the above inferred configuration models, the product dependency reasoned component responds to shopper queries with matching products, similar products within the category, products that are suggested by merchandising rules, and optional products. Additionally, the configuration dependency reasoner component asserts rules that were used in selecting items for truth maintenance process engine 12c.

A grouping reasoned component uses configuration rules and merchandizing rules to validate options selected by the product dependency reasoner component and uses merchandizing rules for further validation. The validated options along with associated products are grouped into a collection and transmitted to the shopper selection reasoned component. Non validated options are moved to a separate list and two lists are returned. A first list comprises configured item groups and a second list comprises a list of items that did not fit into any configuration. Additionally, assumptions used to group and validate the configurations are asserted into truth maintenance process engine 12c. Examples of configuration rules are presented as follows:

A shopper selection reasoner component assigns probabilities that shoppers would buy a recommended collection (with or without options) and sorts grouped items. With respect to computing probabilities, the shopper selection reasoner component uses selection models (represented as a Bayesian tree) to calculate conditional probabilities of users buying a collection with selection probabilities of the collection represented as conditional probabilities between the items. The shopper selection reasoner component matches shopper characteristics that have been shared with a query to locate additional similar shoppers using customer segmentation models and locating a selection probability based on a similarity match between a collection being scored and collections for which selection probabilities have been scored and stored in the model management process. The similarity match is performed by using a clustering model that clusters collections and associated characteristics. Given a collection, the clustering model may locate additional collections that are close to a given collection using density based distances or geometric distances for numerical attributes. The shopper selection reasoner component uses selection probabilities of the user and associated merchandising scores. A system administrator may provide a function that may be used to combine two variable values into one value. The function is used to setup a trade-off between the user selection probability and a merchandising score based on a contribution each variable makes to the score. The function may be linear or non-linear.

Truth Maintenance Process Engine 12c

Truth maintenance process engine 12c retrieves input assumptions entered by the product dependency reasoner component and shopper selection reasoner component. The truth maintenance process engine 12c associates a unique key with each of the assumptions. Additionally, the truth maintenance process engine 12c interacts with the aforementioned reasoner components to capture intermediate facts and conclusions reached while using the assumptions. Truth maintenance process engine 12c may be invoked by the interaction process engine to obtain responses as follows:

1. Given a recommended product, truth maintenance process engine 12c may return assumptions used by the product dependency reasoner component and the grouping reasoner component to select a product.
2. Given a recommended product, truth maintenance process engine 12c may return a dependency tree of assumptions and intermediate conclusions that were used to generate a recommendation.
3. Given a recommended product, truth maintenance process engine 12c may return a conditional probability of a recommended product's chances of being selected given probabilities associated with the assumptions and intermediate conclusions used in recommending a product.

Assumptions and pre-conditions used to generate conclusions asserted by the reasoner components are maintained in a model that tracks a dependency between conclusions, pre-conditions, and assumptions. In addition to tracking the dependencies (using a directed acyclic graph (DAG), the model additionally keeps track of confidence values and probabilities associated with the assumptions and pre-conditions.

Content Process Engine 12d

Content process engine 12d retrieves information associated with products and features. Content process engine 12d comprises a content element indexed by a product item id maintained by recommendation reasoning process engine 12b. Given an id of an item within recommendation reasoning process engine 12b, content process engine 12d will return associated content such as images, textual descriptions, and additional information necessary to display product details to the user.

Model Execution Process Engine 12e

Model execution process engine 12e executes a number of models required by the reasoner components including:
1. Product relevance scoring models.
2. Product alternate scoring models.
3. Product option scoring models.

Figure 2:
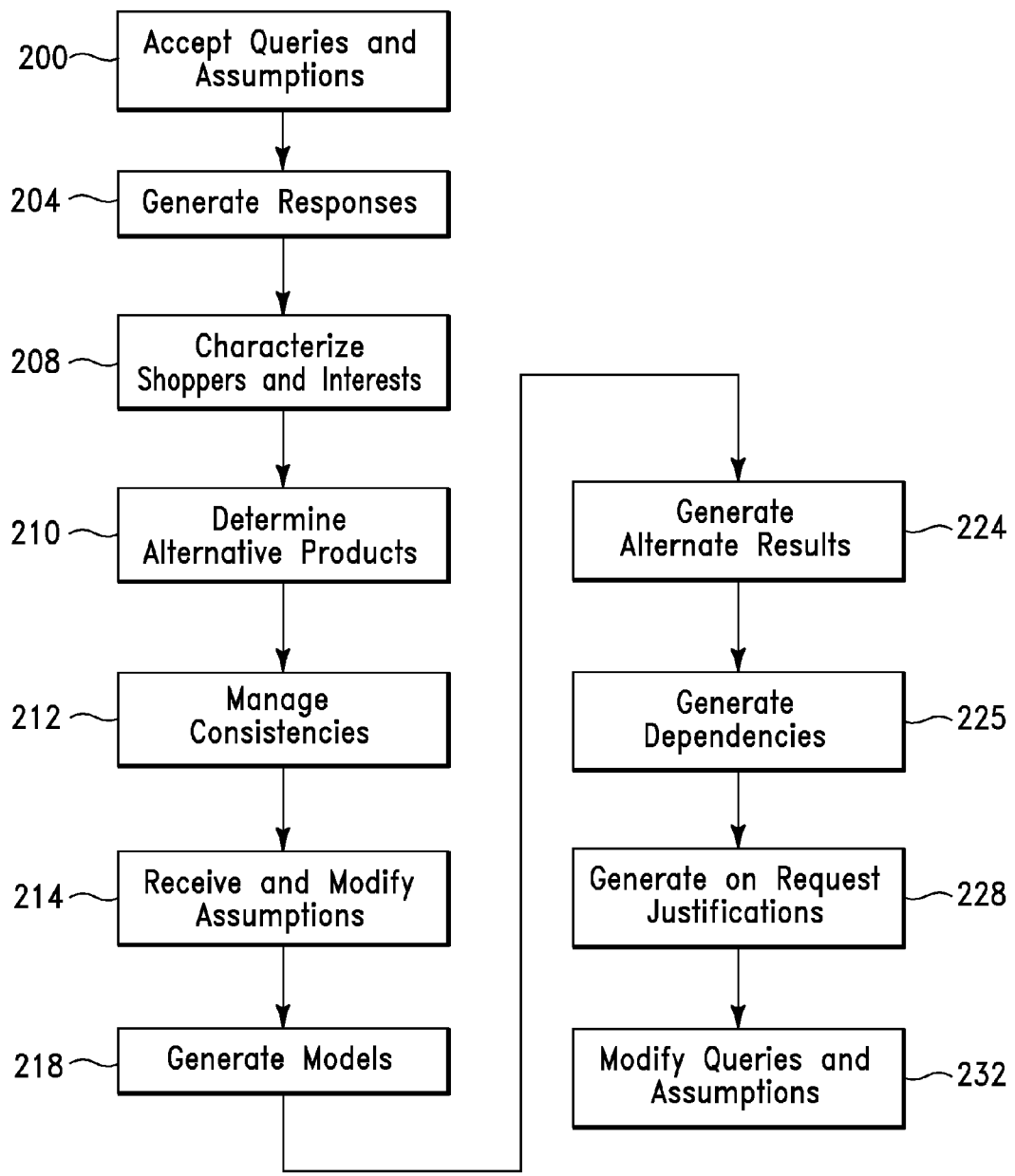
FIG. 2 illustrates an algorithm detailing a process flow enabled by the system of FIG. 1 for recommending products for a shopper, in accordance with embodiments of the present invention.

FIG. 2 illustrates an algorithm detailing a process flow enabled by system 2 of FIG. 1 for recommending products for a shopper, in accordance with embodiments of the present invention. In step 200, a computer processor of a computing system executing an input and response generation layer of a software application, accepts queries and assumptions associated with shopping habits of a shopper. In step 204, the computer processor (executing a content query engine of the software application) generates responses to the queries. The responses are associated with product features for products. In step 208, the computer processor (executing a heuristic reasoning engine of the software application) characterizes a group of shoppers (associated with the shopper) and associated interests resulting in a creation of a group of recommended products. In step 210, computer processor (executing a dependency directed backtracking process with respect to the characterizing of step 208) determines alternative products associated with the recommended products. In step 212, the computer processor (executing a truth maintenance engine of the software application) manages a consistency of assumptions generated during execution of dependency directed backtracking process. In step 214, the computer processor (executing the input and response generation layer) receives a product query (associated with the products and the group of recommended products) and receives a selected set of assumptions for modification. In step 218, the computer processor generates tree based probabilistic models that include rules and facts associated with the assumptions. The tree based probabilistic models classify the group of shoppers and associated shopping behaviors, inferred interests associated with the group of shoppers. In step 224, the computer processor generates groups of alternate results for a rewritten query of the queries. In step 225, the computer processor generates a list of dependencies associated with a group of rules and facts that have been activated with additional rules and facts used to activate the group of said rules and facts. In step 228, the computer processor generates on request justifications associated with a rule of the group of said rules and facts. The on request justifications are activated as an explanatory tree. In step 232, the computer processor modifies the queries and assumptions by adding, removing, or changing values of the queries and assumptions.

Figure 3:
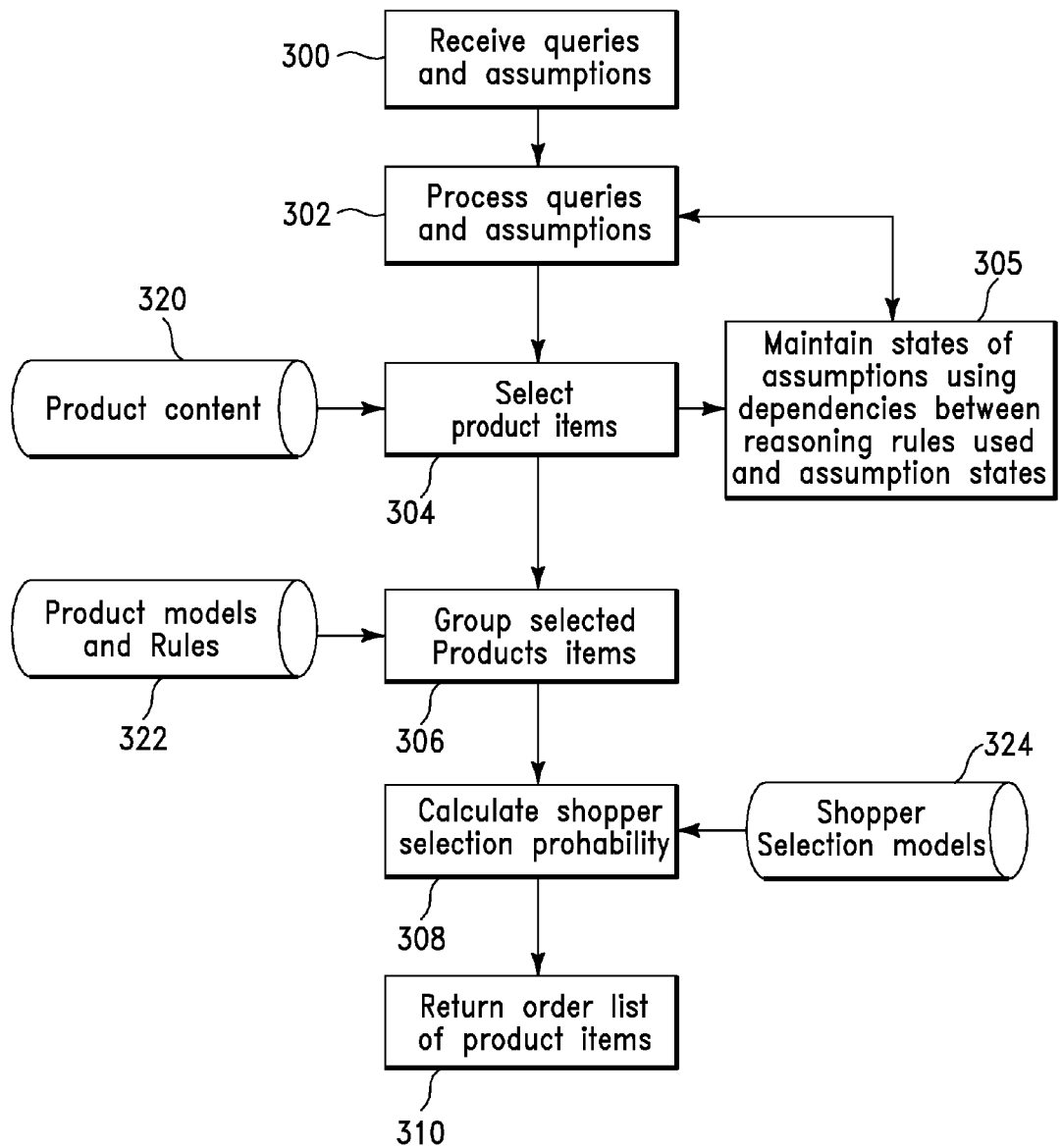
FIG. 3 illustrates an algorithm detailing a process flow enabled by the system of FIG. 1 for generating a product list of ordered items, in accordance with embodiments of the present invention.

FIG. 3 illustrates an algorithm detailing a process flow enabled by system 2 of FIG. 1 for generating a product list of ordered items, in accordance with embodiments of the present invention. In step 300, a computer processor receives queries and assumptions. In step 302, the computer processor processes the queries and assumptions. In step 304, the computer processor receives product content 320 and selects product items associated with product relationships. In step 305, states of assumptions are maintained using dependencies between reasoning rules and assumption states and step 302 is repeated. In step 306, product models and rules 322 are received and selected product items are grouped in accordance with product alternatives, product options, product configurations, and merchandizing constraints. In step 308, the computer processor calculates (based on shopper selection models 324) a shopper selection probability and appends the shopper selection probability to the grouped product items. In step 310, the computer processor returns an ordered list of product items.

Figure 4:
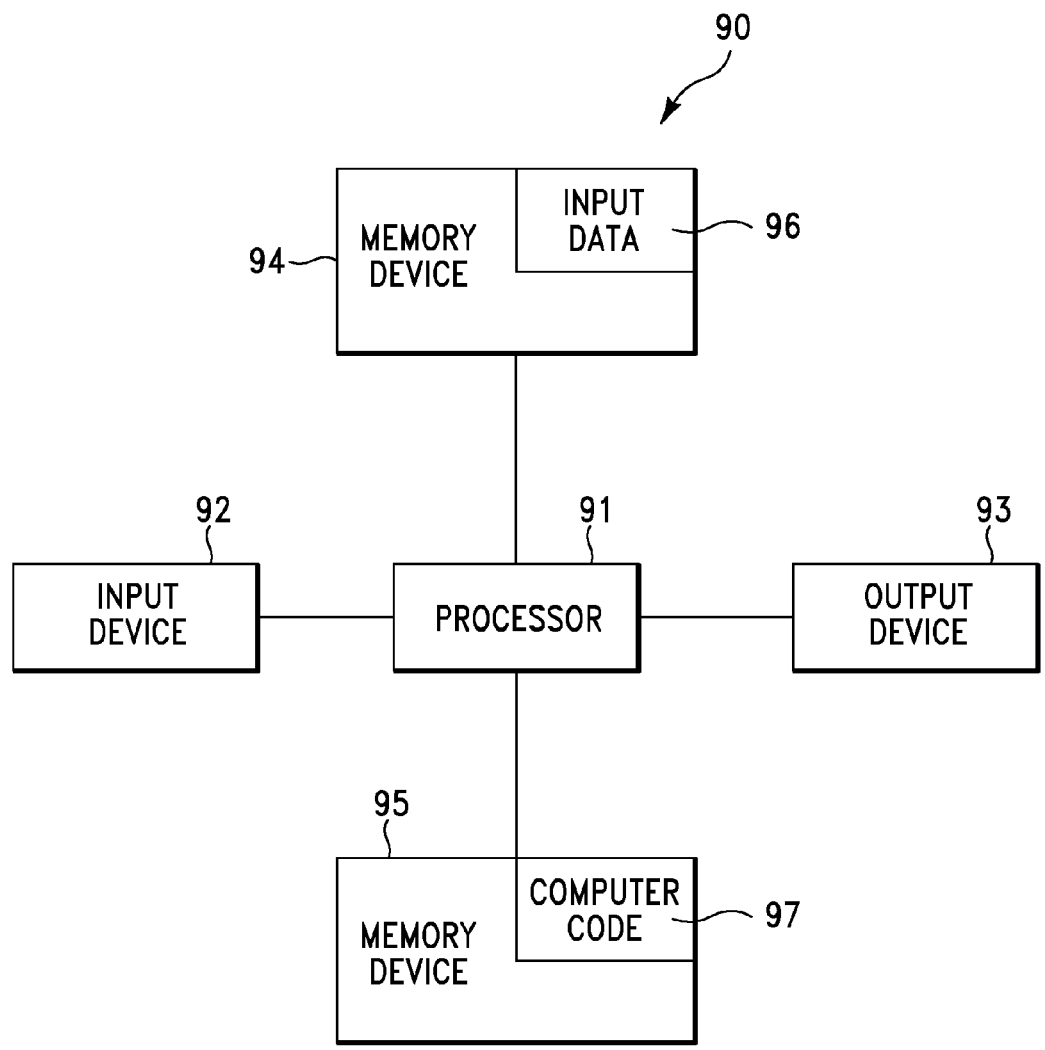
FIG. 4 illustrates a computer apparatus used by the system of FIG. 1 for recommending products for a shopper, in accordance with embodiments of the present invention.

FIG. 4 illustrates a computer apparatus 90 used by system 2 of FIG. 1 for recommending products for a shopper, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 1) for recommending products for a shopper. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the algorithms of FIGS. 2 and 3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service supplier who offers to recommend products for a shopper. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for recommending products for a shopper. In another embodiment, the invention provides a business method that performs the process steps of the invention on a subscription, advertising, and/or fee basis. That is, a service supplier, such as a Solution Integrator, could offer to recommend products for a shopper. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
accepting, by a computer processor of a computing system executing an input and response generation layer of a software application, queries and assumptions associated with shopping habits of a shopper;
generating, by said computer processor executing a content query engine of said software application, responses to said queries, said responses associated with product features for products;
characterizing, by said computer processor executing a heuristic reasoning engine of said software application; a group of shoppers and associated interests resulting in a creation of a group of recommended products, said group of shoppers associated with said shopper, wherein said characterizing comprises:
analyzing mined shopper choice models;
analyzing purchase behavior based grouping and categorization models of products of different types to support guided navigation;
analyzing truth maintenance data combined with conditional probabilities to support exploration in the context of the guided navigation; and
executing statistical models resulting in generated scores, probabilities, and probabilistic data;
generating, by said computer processor executing said heuristic reasoning engine, pairs of grouped listings of said products and associated assumptions;
generating, by said computer processor, tree based probabilistic models comprising rules and facts associated with said assumptions, wherein said tree based probabilistic models classify said group of shoppers, shopping behaviors associated with said group of shoppers, inferred interests associated with said group of shoppers, and wherein said tree based models are configured to group products of various types;
generating, by said computer processor, groups of alternate results for a rewritten query of said queries;
maintaining, by said computer processor, a record of dependencies associated with individual rules that have been activated with additional rules, additional facts, and additional assumptions used to activate the rules;
generating, by said computer processor, on request justifications for a specified rule activated as an explanatory tree;
determining, by said computer processor executing a dependency directed backtracking process with respect to said characterizing, alternative products associated with said recommended products; and
managing, by said computer processor executing a truth maintenance engine of said software application, a consistency of assumptions generated during said executing said dependency directed backtracking process.

2. The method of claim 1, further comprising:
receiving, by said computer processor executing said input and response generation layer, product query associated with said products and said group of recommended products; and
receiving, by said computer processor executing said input and response generation layer, a selected set of assumptions of said assumptions for modification.

3. The method of claim 1, further comprising:
generating, by said computer processor, pairs of grouped listings of said queries and said assumptions.

4. The method of claim 1, further comprising:
generating, by said computer processor, a list of dependencies associated with a group of said rules and facts that have been activated with additional rules and facts used to activate said group of said rules and facts;
generating, by said computer processor, on request justifications associated with a rule of said group of said rules and facts, wherein said on request justifications are activated as an explanatory tree; and
modifying, by said computer processor, said queries and assumptions by adding, removing, or changing values of said queries and assumptions.

5. A computer program product, comprising a computer readable storage device storing a computer readable program code, said computer readable program code comprising an algorithm that when executed by a computer processor of a computing system implements a method, said method comprising:
accepting, by said computer processor executing an input and response generation layer of a software application, queries and assumptions associated with shopping habits of a shopper;

generating, by said computer processor executing a content query engine of said software application, responses to said queries, said responses associated with product features for products;

characterizing, by said computer processor executing a heuristic reasoning engine of said software application; a group of shoppers and associated interests resulting in a creation of a group of recommended products, said group of shoppers associated with said shopper, wherein said characterizing comprises:

analyzing mined shopper choice models;

analyzing purchase behavior based grouping and categorization models of products of different types to support guided navigation;

analyzing truth maintenance data combined with conditional probabilities to support exploration in the context of the guided navigation; and executing statistical models resulting in generated scores, probabilities, and probabilistic data;

generating, by said computer processor executing said heuristic reasoning engine, pairs of grouped listings of said products and associated assumptions;

generating, by said computer processor, tree based probabilistic models comprising rules and facts associated with said assumptions, wherein said tree based probabilistic models classify said group of shoppers, shopping behaviors associated with said group of shoppers, inferred interests associated with said group of shoppers, and wherein said tree based models are configured to group products of various types;

generating, by said computer processor, groups of alternate results for a rewritten query of said queries;

maintaining, by said computer processor, a record of dependencies associated with individual rules that have been activated with additional rules, additional facts, and additional assumptions used to activate the rules;

generating, by said computer processor, on request justifications for a specified rule activated as an explanatory tree;

determining, by said computer processor executing a dependency directed backtracking process with respect to said characterizing, alternative products associated with said recommended products; and managing, by said computer processor executing a truth maintenance engine of said software application, a consistency of assumptions generated during said executing said dependency directed backtracking process.

6. The computer program product of claim 5, wherein said method further comprises:

receiving, by said computer processor executing said input and response generation layer, product query associated with said products and said group of recommended products; and receiving, by said computer processor executing said input and response generation layer, a selected set of assumptions of said assumptions for modification.

7. The computer program product of claim 5, wherein said method further comprises:

generating, by said computer processor, pairs of grouped listings of said queries and said assumptions.

8. The computer program product of claim 5, wherein said method further comprises:

generating, by said computer processor, a list of dependencies associated with a group of said rules and facts that have been activated with additional rules and facts used to activate said group of said rules and facts ;

generating, by said computer processor, on request justifications associated with a rule of said group of said rules and facts, wherein said on request justifications are activated as an explanatory tree; and modifying, by said computer processor, said queries and assumptions by adding, removing, or changing values of said queries and assumptions.

9. A computer system comprising a computer processor coupled to a computer-readable memory unit, said memory unit comprising instructions that when executed by the computer processor of a computing system implements a method comprising:

accepting, by said computer processor executing an input and response generation layer of a software application, queries and assumptions associated with shopping habits of a shopper;

generating, by said computer processor executing a content query engine of said software application, responses to said queries, said responses associated with product features for products;

characterizing, by said computer processor executing a heuristic reasoning engine of said software application; a group of shoppers and associated interests resulting in a creation of a group of recommended products, said group of shoppers associated with said shopper, wherein said characterizing comprises:

analyzing mined shopper choice models;

analyzing purchase behavior based grouping and categorization models of products of different types to support guided navigation;

analyzing truth maintenance data combined with conditional probabilities to support exploration in the context of the guided navigation; and executing statistical models resulting in generated scores, probabilities, and probabilistic data;

generating, by said computer processor executing said heuristic reasoning engine, pairs of grouped listings of said products and associated assumptions;

generating, by said computer processor, tree based probabilistic models comprising rules and facts associated with said assumptions, wherein said tree based probabilistic models classify said group of shoppers, shopping behaviors associated with said group of shoppers, inferred interests associated with said group of shoppers, and wherein said tree based models are configured to group products of various types;

generating, by said computer processor, groups of alternate results for a rewritten query of said queries;

maintaining, by said computer processor, a record of dependencies associated with individual rules that have been activated with additional rules, additional facts, and additional assumptions used to activate the rules;

generating, by said computer processor, on request justifications for a specified rule activated as an explanatory tree;

determining, by said computer processor executing a dependency directed backtracking process with respect to said characterizing, alternative products associated with said recommended products; and managing, by said computer processor executing a truth maintenance engine of said software application, a consistency of assumptions generated during said executing said dependency directed backtracking process.

10. The computer system of claim 9, wherein said method further comprises:

receiving, by said computer processor executing said input and response generation layer, product query associated with said products and said group of recommended products; and receiving, by said computer processor executing said input and response generation layer, a selected set of assumptions of said assumptions for modification.

11. The computer system of claim 9, wherein said method further comprises:

generating, by said computer processor, pairs of grouped listings of said queries and said assumptions.

12. The computer system of claim 9, wherein said method further comprises:

generating, by said computer processor, a list of dependencies associated with a group of said rules and facts that have been activated with additional rules and facts used to activate said group of said rules and facts ;

generating, by said computer processor, on request justifications associated with a rule of said group of said rules and facts, wherein said on request justifications are activated as an explanatory tree; and modifying, by said computer processor, said queries and assumptions by adding, removing, or changing values of said queries and assumptions.

13. A process for supporting computing infrastructure, the process comprising providing at least one support service for at least one of creating, integrating, hosting, maintaining, and deploying computer-readable code in a computer comprising a computer processor, wherein the computer processor carries out instructions contained in the code that when executed by the computer processor causes the computer to perform a method comprising the steps of:

accepting, by said computer processor executing an input and response generation layer of a software application, queries and assumptions associated with shopping habits of a shopper;

generating, by said computer processor executing a content query engine of said software application, responses to said queries, said responses associated with product features for products;

characterizing, by said computer processor executing a heuristic reasoning engine of said software application; a group of shoppers and associated interests resulting in a creation of a group of recommended products, said group of shoppers associated with said shopper, wherein said characterizing comprises:

analyzing mined shopper choice models;

analyzing purchase behavior based grouping and categorization models of products of different types to support guided navigation;

analyzing truth maintenance data combined with conditional probabilities to support exploration in the context of the guided navigation; and executing statistical models resulting in generated scores, probabilities, and probabilistic data;

generating, by said computer processor executing said heuristic reasoning engine, pairs of grouped listings of said products and associated assumptions;

generating, by said computer processor, tree based probabilistic models comprising rules and facts associated with said assumptions, wherein said tree based probabilistic models classify said group of shoppers, shopping behaviors associated with said group of shoppers, inferred interests associated with said group of shoppers, and wherein said tree based models are configured to group products of various types;

generating, by said computer processor, groups of alternate results for a rewritten query of said queries;

maintaining, by said computer processor, a record of dependencies associated with individual rules that have been activated with additional rules, additional facts, and additional assumptions used to activate the rules;

generating, by said computer processor, on request justifications for a specified rule activated as an explanatory tree;

determining, by said computer processor executing a dependency directed backtracking process with respect to said characterizing, alternative products associated with said recommended products; and managing, by said computer processor executing a truth maintenance engine of said software application, a consistency of assumptions generated during said executing said dependency directed backtracking process.

14. The process of claim 13, wherein said method further comprises:

receiving, by said computer processor executing said input and response generation layer, product query associated with said products and said group of recommended products; and receiving, by said computer processor executing said input and response generation layer, a selected set of assumptions of said assumptions for modification.

15. The process of claim 13, wherein said method further comprises:

generating, by said computer processor, pairs of grouped listings of said queries and said assumptions.

16. The process of claim 13, wherein said method further comprises:

generating, by said computer processor, a list of dependencies associated with a group of said rules and facts that have been activated with additional rules and facts used to activate said group of said rules and facts;

generating, by said computer processor, on request justifications associated with a rule of said group of said rules and facts, wherein said on request justifications are activated as an explanatory tree; and modifying, by said computer processor, said queries and assumptions by adding, removing, or changing values of said queries and assumptions.

* * * * *